Figure 5:
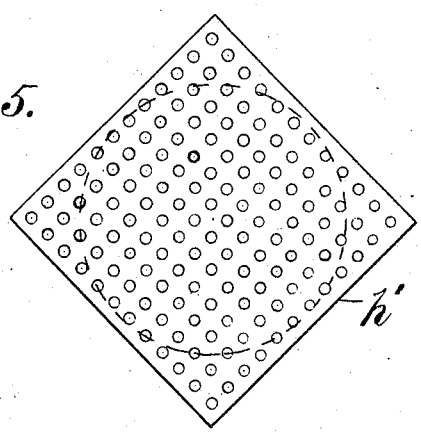

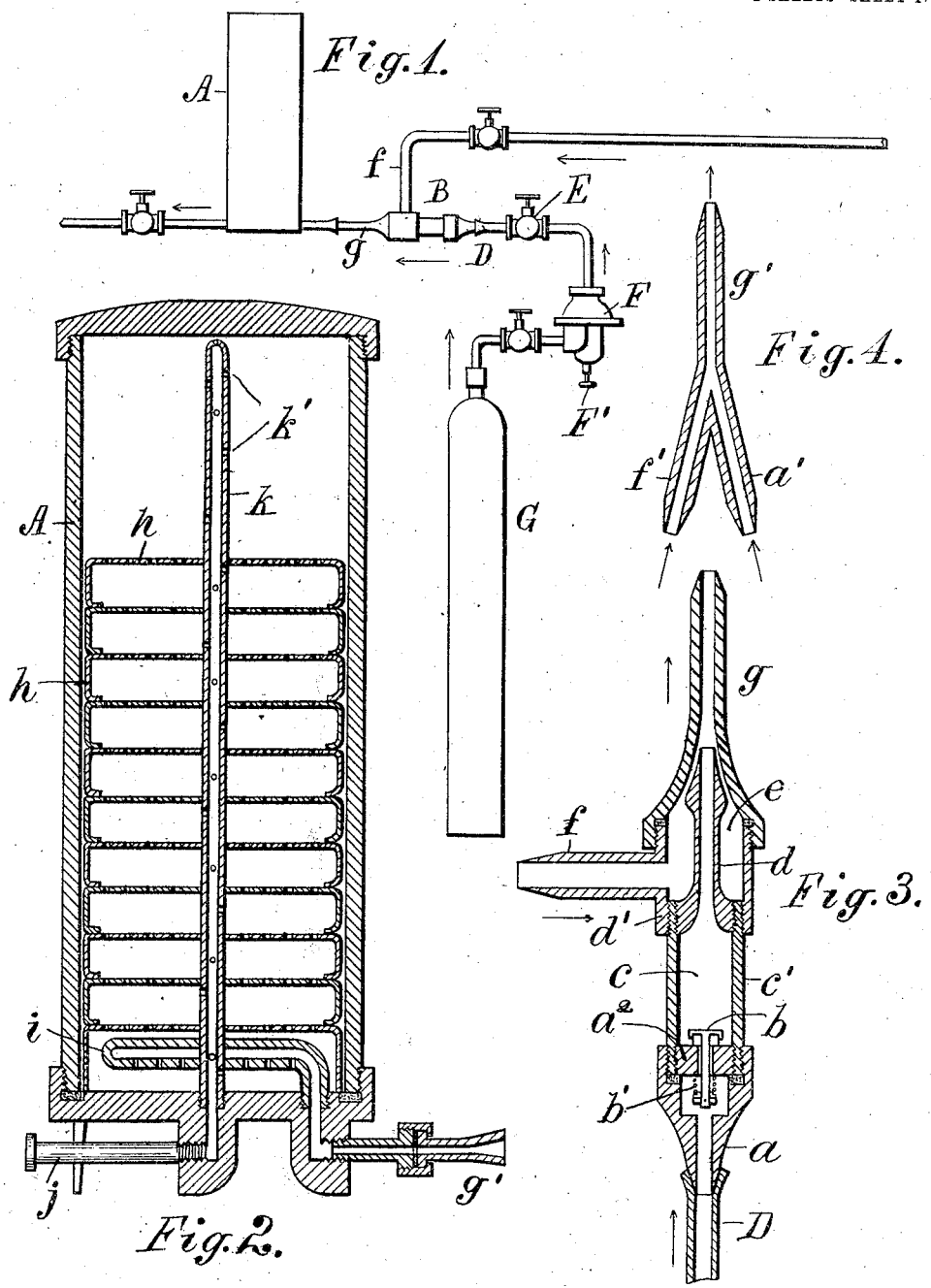

No. 889,516. PATENTED JUNE 2, 1908.
J. H. FOX.
INJECTOR CARBONATOR.
APPLICATION FILED APR. 25, 1906.

2 SHEETS—SHEET 2

Attest:
L. Lee

Inventor.
John H. Fox, per
Thomas S. Crane, Atty

UNITED STATES PATENT OFFICE.

JOHN H. FOX, OF NEW YORK, N. Y.

INJECTOR-CARBONATOR.

No. 889,516.  Specification of Letters Patent.  Patented June 2, 1908.

Application filed April 25, 1906. Serial No. 313,598.

*To all whom it may concern:*

Be it known that I, JOHN H. FOX, a citizen of the United States, residing at 228 East One-hundred and Twenty-third street, New York, county of New York, and State of New York, have invented certain new and useful Improvements in Injector-Carbonators, fully described and represented in the following specification and the accompanying drawings, forming a part of the same.

The present invention relates to an apparatus for effecting the continuous carbonation of water as it is drawn from a fountain for use as a beverage, the apparatus being supplied automatically with gas and water when the carbonated liquid is drawn from its receptacle, and such supply ceasing when the draft from the receptacle stops.

The apparatus comprises means for twice mingling the gas and water together by separate instrumentalities so as to effectually carbonate the water, and it also provides means for mingling free gas with the water as it passes out of the receptacle, to give it a special sparkling character. The gas is first mingled with the water by an injector, which is made of special construction embracing a check-valve, to enable it to supply the carbonator automatically and to prevent the entrance of water to the gas-supply pipe when the draft from the receptacle ceases. The gas and water are mingled a second time by means of a receptacle containing perforated pans, below which pans the gas and water mingled by the injector are delivered, and the draft from the receptacle is so arranged that the mingled gas and water rise through the perforations in the pans when there is any draft from the receptacle. Such movement of the liquid through the perforations in the pans repeatedly sub-divides the water and re-mingles the same with the gas which has not been absorbed by the water during its mingling in the injector. A portion of such unabsorbed gas necessarily rises in the top of the receptacle, and the water is drawn from the receptacle by a tube extended through the bottom and upwardly through the pans into the gas-space above the liquid in the receptacle where a perforation of the tube in such gas-space permits the free gas to enter the tube whenever liquid is drawn off, and thus to mingle directly with the water to give the same a sparkling quality.
In this invention, each step in the treatment of the water is essential to produce a perfect carbonation of the water by which a large portion of the gas will be absorbed and will be retained for a considerable time, to produce a "live" or sparkling beverage when the liquid is drawn into an open glass.

The injector includes a check-valve applied to the gas-inlet of the injector-fixture, and a small gas-reservoir or chamber between such check-valve and the gas-outlet, which chamber may contain sufficient gas to carbonate the water, as one or two glasses, which would be drawn from the receptacle at a single time.

The invention also includes a new construction for the pans.

The invention will be understood by reference to the annexed drawing, in which

Figure 6:
Figure 7:
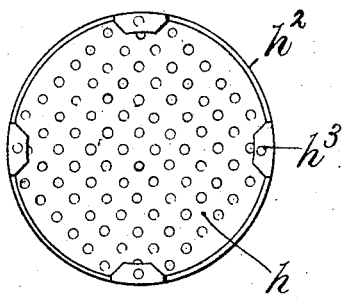

Figure 1 is a diagram showing the carbonator and its connections; Fig. 2 is a vertical section of the carbonator; Fig. 3 is a longitudinal section of the injector provided with the check-valve; and Fig. 4 an alternative construction for the injector made of a single Y-fitting. Figs. 5 to 7 are details of the perforated pans.

In Fig. 1, A designates the receptacle for carbonating water, B the injector, $f''$ the pipe supplying water thereto, D the pipe supplying gas thereto, and provided with cock E, and F is the pressure-regulator interposed between the gas-cylinder or tank G and the injector.

From whatever source the water-supply be drawn the pressure of the gas is regulated, as by the hand-wheel F' upon the regulator, a few pounds below that of the water, so that the gas may not crowd past the water into the receptacle and accumulate in the upper part of the same. With such relation of the two pressures, the water draws a sufficient quantity of gas through the injector to supply the carbonating receptacle with the required mixture of gas and water.

The receptacle A is shown provided with a series of perforated so-called pans $h$ and with an inlet-pipe $g'$ which receives the mixture of gas and water from the injector and discharges it into the bottom of the receptacle by a perforated pipe $i$. The outlet pipe $j$ for carbonated water is shown connected at the bottom of the receptacle with a perforated stand-pipe $k$, the upper perforations $k'$ serving to draw off any gas that may accumulate in the top of the receptacle and thus permit 11' the continued inflow of water, which would be obstructed by the accumulation of gas.

Any injector may be used which is provided with two nozzles related to one another in a suitable manner so that the water nozzle may form a partial vacuum in the gas nozzle and draw the gas therefrom so as to mingle the gas and water and discharge the mixture into the receptacle, Fig. 4 showing a Y-fixture with a branch $a'$ for the gas, a branch $f''$ for the water, and a branch $g'$ for discharging the mixture. The water with such an injector is introduced at a few pounds pressure above that of the gas and operates to draw the gas into the pipe $g'$ and mingle it with the water in its passage to the carbonating receptacle. The water thus operates because its momentum when discharged from the pipe $f''$ into the pipe $g'$ causes a partial vacuum in the pipe $a'$ and draws the gas therefrom.

A special construction for an injector, adapted particularly to maintain the supply of gas to the water, is shown in Fig. 3, in which the injector is formed of a threaded pipe $c'$ and suitable fittings. The gas-inlet $d$ is screwed upon one end of such pipe and a valve-seat $a^2$ is screwed upon the same end, and a check-valve $b$ seated inside of the same and held normally upon the seat by a spring $b'$.

Upon the opposite end of the pipe a tee-fixture $d'$ is screwed with a branch $f$ at one side for the water supply. A gas-outlet having projecting nozzle $d$ is screwed within the same end of the pipe and the nozzle projected forward beyond the tee-fixture $d'$. A tapering discharge-tube $g$ is screwed upon the end of the tee-fixture and contracted to fit rather close to the gas nozzle. The interior of the tee-fixture forms a water-chamber $e$, supplied at its side; and discharging the water into the tapering tube $g$ past the gas-nozzle so as to draw the gas therefrom. The interior of the pipe $c'$ forms a small gas-chamber $c$ which is proportioned to contain enough gas to carbonate the contents of the receptacle A, or such part of the same as would be drawn off at one time. Such a gas-chamber is necessary where the pressure of the gas is lower than that of the water, as the gas is unable to flow into the injector after a period of quiescence until a sufficient flow of water is established to produce a partial vacuum in the chamber $c$ and thus draw a fresh volume of gas into the gas-nozzle. This construction of the injector renders the operation of the injector and carbonator entirely automatic, when the pressure of the water and the gas supplies are regulated as described. The drawing off of carbonated water from the pipe $k$ and outlet $j$ permits the inflow of water from the injector, which delivers a suitable proportion of gas mingled with it, which, entering the bottom of the receptacle, passes upwardly through the pans $h$.

It is evident that the gas and water mingled by the injector are discharged immediately therefrom without any opportunity for absorption of the gas by the water; but the perforated pans through which the water gradually rises as it is drawn from the receptacle, operated to repeatedly subdivide the water and re-mingle it with the gas which is mixed therewith, so as to greatly promote its absorption. The gas not absorbed by the water necessarily rises into the top of the receptacle.

When the apparatus is in continuous operation, it is not essential that the gas should all be dissolved in the water, as the gas which is not dissolved is finely diffused through the water and is drawn off by the perforations $k'$, because the opening of the "draft-arm" almost wholly destroys the pressure within the pipe $k$ and causes an instantaneous flow of fluid, whether it be gas or water, into all the perforations of the pipe. The particles of gas in the water space tend to rise, but the reduction of pressure within the pipe $k$ causes them to flow in the water to the perforations, and such reduction of pressure also causes the gas to enter the perforations in the gas space, and to pass out of the pipe with the water which is entering the same, the two becoming intimately mingled as they move through the pipe, so as to flow from the draft-tube together. Such entrainment of the gas is due to the fact that it is a lighter and more mobile fluid than water, and when the reduction of pressure occurs within the pipes $k$, the gas enters more freely than the water and flows more freely within the pipe toward its inlet. The outflow of the gas from the gas space wholly prevents the accumulation of gas in the upper part of the receptacle, which except for the perforations in the gas space, would accumulate steadily within the receptacle until no room was left for water. The construction avoids the necessity for a vent cock upon the top of the receptacle which has heretofore been commonly used in such carbonators, through which gas must be blown off frequently to discharge the accumulation which prevents the entrance of water. The water drawn from this carbonator has an especially sparkling quality due to the entrainment of gas with the water, by the use of perforations in the gas and water space.

The check-valve operates when the water first moves into the injector, after a draft of carbonated water from the receptacle, to prevent the water from crowding into the gas nozzle $d$ and backwardly into the gas-supply pipe D, which is shown in Figs. 1 and 3. Such backward movement of the water might occur before the discharge of water from the tube $g$ was established, by reason of the excess of the water pressure above the gas pressure. The check-valve forces all of the water which enters the water-chamber $e$ to pass outwardly from the discharge-tube $g$, the contents of the gas-chamber $c$ meanwhile supplying the gas until the movement of the water current produces a suction upon the gas nozzle $d$ and allows the gas to enter from the pipe D.

To economize the "block-tin" or pure sheet tin in the manufacture of perforated pans $h$, I have devised the special method of manufacture shown in Figs. 5, 6 and 7. Fig. 5 is a plan of a square blank with a dotted circle representing the size of the pan; Fig. 6 is an edge view of the pan finished; and Fig. 7 shows the under side of the pan.

By my new method of manufacture, I cut square sections or blanks $h'$ from a sheet of the block-tin, only a little wider than the diameter of the desired pan, and stamp the same in dies to bend the four corners downward to form feet or flanges $h^2$ which support the pans upon one another as shown in Fig. 1. The points of the corners may be turned inward as shown at $h^3$ in Figs. 6 and 7, to rest upon the top of the pan beneath; but such a bending inward is not essential. Much less sheet-metal is required to make each pan by thus utilizing the corners as supports or flanges, than where a circular blank is employed of sufficient size to make a complete annular flange underneath the whole pan.

The operation of my apparatus is to mingle the gas and water first in the injector, and then repeatedly to sub-divide and diffuse the particles of gas and water in the receptacle A to promote the absorption of gas; and thirdly, to mingle with the current of water which is drawn off by the pipe $k$, the free gas which accumulates in the top of the receptacle when there is no movement of the water.

Having thus set forth the nature of the invention what is claimed herein is:

1. An apparatus for corbonating water, comprising the following means for thrice mingling the gas and water, first, an injector supplied with gas and water, second, a receptacle containing horizontal perforated partitions with the mixture of gas and water from the injector introduced below such partitions, and rising through the perforations of the pans during the discharging movement to be mingled the second time thereby, and third, the receptacle having a gas-space in the top and a draft-tube extended from the bottom of the receptacle upward through the pans with the perforation in the gas-space above the water, and the free gas entering directly from such gas-space into the drawing-tube and mingling with the water in its discharge from the receptacle, whereby the continued accumulation of gas in the said gas-space is prevented, and the gas in such space is utilized whenever water is drawn from the receptacle.

2. An apparatus for carbonating water, comprising a receptacle for the carbonated water having at the bottom the carbonated water-outlet $j$ and inlet $g'$ for the mixed gas and water, the injector connected to the said inlet and composed of the pipe $c$ with valve-seat $a^2$ screwed inside the same and provided with check-valve $b'$, the pipe $c$ having the gas-inlet $a$ screwed upon one end and the gas-nozzle $d$ screwed within the opposite end, and the T-fitting $d'$ screwed upon the outside of the same forming the water-chamber $e$ around the nozzle $d$ with water-inlet $f$ at the side, and the tapering gas-outlet $g$ secured upon the T-fitting and surrounding the point of the gas-nozzle $d$, the pipe $c$ forming a small reservoir of gas between the nozzle $d$ and the check-valve $b$, to supply the current of water with gas until the pressure in the chamber is suitably diminished.

3. In a carbonating apparatus, the combination, with the cylindrical receptacle A for carbonating the water, of a series of perforated sheet-metal pans formed from square blanks a little larger than the pans, each pan having four legs and each leg having its edges sloped downwardly and terminating in a point, and such points turned inwardly to form flat feet to support the several pans upon one another.

In testimony whereof I have hereunto set my hand in the presence of two subscribing witnesses.

JOHN H. FOX.

Witnesses:
 DAISON D. PURRINGTON,
 THOMAS S. CRANE.